March 4, 1958     W. A. ALEXANDER     2,825,621
SEISMIC RECORDING APPARATUS
Filed Sept. 19, 1956     2 Sheets-Sheet 1

Warren A. Alexander    Inventor

By W. O. T Heilman   Attorney

March 4, 1958    W. A. ALEXANDER    2,825,621
SEISMIC RECORDING APPARATUS
Filed Sept. 19, 1956    2 Sheets-Sheet 2

Warren A. Alexander    Inventor

By W. O. T Heilman    Attorney

United States Patent Office 2,825,621
Patented Mar. 4, 1958

2,825,621

SEISMIC RECORDING APPARATUS

Warren A. Alexander, Tulsa, Okla., assignor to Esso Research and Engineering Company, a corporation of Delaware Application September 19, 1956, Serial No. 610,818

4 Claims. (Cl. 346—74)

The present invention relates to seismic exploration and more particularly relates to an improved method and apparatus for graphically recording seismic information.

Seismic exploration is well known in the art and is widely used for determining the nature and location of underground geological formations. Such exploration is normally carried out by detonating an explosive charge at or near the earth's surface to produce shock waves which travel downwardly into the earth and are at least in part reflected back to the surface by the various substrata. These reflected waves are received by seismic detectors or geophones positioned in suitable arrays on the earth's surface and are converted into electrical impulses which may then be recorded.

In order to permit visual analysis and interpretation of seismic information, it is necessary that the information be recorded in graphic form. The graphic record may be prepared directly from the electrical impulses produced by geophones or seismic detectors or from an intermediate "phonographic" record prepared on magnetic tape, wire or discs. The most common graphic recording system is variable amplitude recording, wherein the electrical impulses produced by individual geophones or systems of geophones are amplified and then fed into a bank of reflecting mirror galvanometers which direct beams of light onto a moving strip of photographic paper. Upon development of the paper, the exposed areas appear as oscillatory traces. Because of the obvious disadvantages of recording systems using photographic processes, it is often preferred to record seismic information upon "phonographic" or other reproducible records and then reproduce the information in graphic form a single channel or trace at a time. This is normally accomplished by means of a galavanometer coupled mechanically or electromagnetically with a pen which produces an oscillatory trace upon a moving strip of paper.

Although this system of preparing graphic records is more convenient in many instances than systems employing photographic processes and produces seismic traces susceptible of rapid and accurate analysis without specialized analyzing equipment, there are certain features which have heretofore limited its applicability. It has been found, for example, that the response of the pens of the recorders employed in this system of recording is limited and that at high frequencies, about about 150 C. P. S., the pens cannot satisfactorily produce accurate traces because of lags in the coupling systems. Moreover, a certain amount of distortion is produced by the recording pens and reflected in the traces because the pens are positioned on pivoted arms and thus move in circular arcs rather than in straight lines. With the conventional pen motor recorder this distortion becomes significant when the amplitude of the trace varies more than about ⅜ of an inch and correction for the distortion becomes necessary. A further disadvantage of conventional variable amplitude recording apparatus is that means must be separately provided to permit determination of the time interval between the shot and reception of the successive seismic impulses. A few thousandths of a second error can produce major errors in depth determinations and complex equipment must therefore be utilized to indicate the elapsed time on the seismic record.

It is therefore an object of the present invention to provide improved apparatus for the production of nonphotographic variable amplitude seismic records capable of recording high frequency seismic information.

A further object is to provide a nonphotographic variable amplitude seismic recording apparatus capable of recording seismic information graphically without appreciable distortion.

A still further object of the invention is to provide an improved seismic recording apparatus of the nonphotographic variable amplitude type wherein provision is made for readily and accurately determining from the seismic trace itself the elapsed time between the shot and successive seismic impulses.

Other objectives will be apparent from the description of the invention.

The objectives of the present invention are achieved by providing a recording apparatus which produces a trace made up of a series of parallel marks impressed at regular time intervals upon a strip of electrosensitive paper moving through the apparatus at a constant speed. Variations in amplitude are shown by lateral displacement of the marks. These marks are made by a plurality of electrical styli positioned at regular intervals about the periphery of a disc rotating at constant speed and at right angles to the direction of motion of the paper. The apparatus does not utilize pens supported by pivoted arms and is therefore free from the mechanical limitations and distortions associated with such pens. Because the marks are made at regular time intervals, for example, every ¼₀₀₀ of a second, elapsed time can be readily determined and timing lines need not be separately produced on the seismic record.

The nature of the invention can perhaps be best understood by reference to the appended drawings in which.

Figure 1:
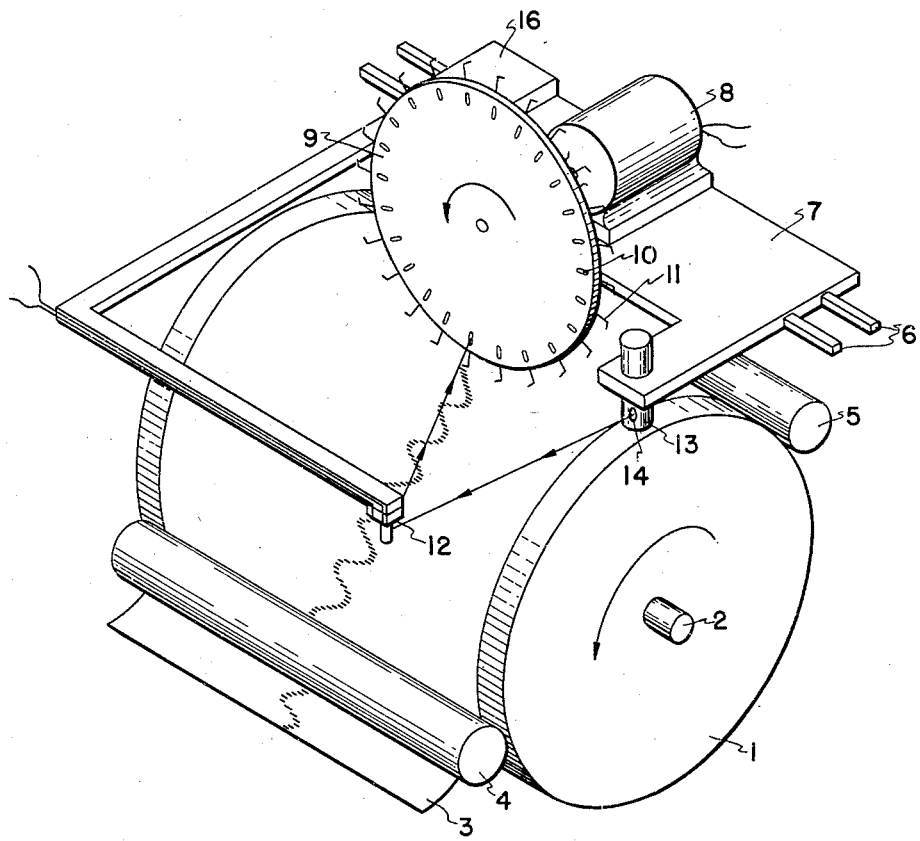
Figure 1 depicts in isometric detail a variable amplitude seismic recording apparatus embodying the present invention.
Figure 2:
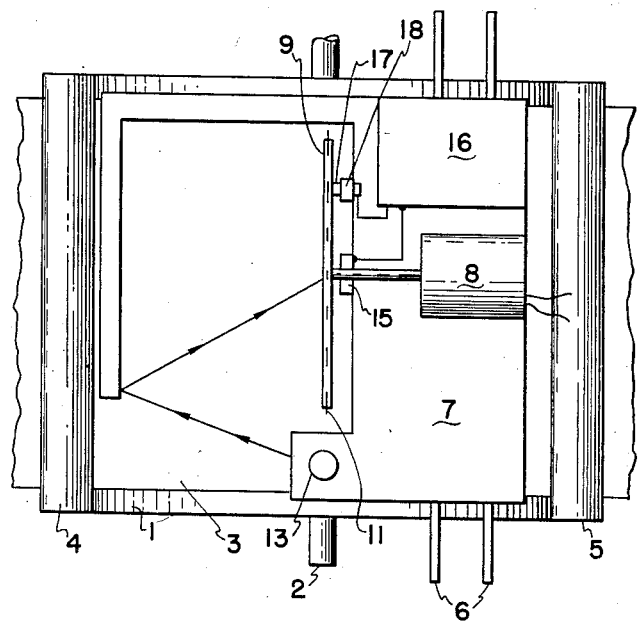
Figure 2 represents a vertical view of the apparatus of Figure 1.

Referring now to Figures 1 and 2, reference numeral 1 represents a cylindrical metallic drum rotated at a constant speed on a horizontal shaft 2 by a synchronous motor which is not shown. Carried on the surface of drum 1 is a continuous strip of electrosensitive paper 3 having a coating of graphite or other conductive material on the under side thereof. An electrical charge applied to the upper surface of such paper travels through the paper, producing a burn or mark thereon. Such paper is widely used in other instrumentation applications and is readily available from numerous commercial sources. The surface of drum 1 is electrically grounded. Rollers 4 and 5 roll upon the electrosensitive paper on the drum and insure that the paper is continuously in contact with the drum surface. Suitable reels, not shown, may be provided to store and feed the paper to the drum and to receive the completed seismic record. Positioned above the drum and parallel to the shaft thereof are parallel ways 6 upon which is positioned carriage 7. Set screws, clamps, or other locking devices may be provided to prevent motion of the carriage during recording. Supported upon carriage 7 is a fractional horsepower synchronous motor 8. The speed at which motor 8 must rotate will be determined by the time interval desired between marks on the trace and the number of styli on the disc, as will be explained later.

Affixed to the shaft of motor 8 is metallic disc 9, which is perforated by a plurality of small slits or apertures 10 evenly spaced around the outer edge thereof. Extending radially from the periphery of disc 9 at evenly spaced intervals are wire styli 11, there being one stylus corresponding to each aperture in the disc. The styli are sufficiently resilient to permit contact with the paper without permanent distortion and each stylus is adapted to brush in succession across the electrosensitive paper for a fixed distance as the disc rotates. This distance may be about 1 inch. No two styli contact the paper at the same instant. In front of disc 9 and supported by an extension of carriage 7 is reflecting mirror galvanometer 12, which is positioned to reflect a narrow beam of light from light source 13 onto the face of the disc at the level of the lowermost aperture therein. Alternatively, the light beam may be directed at the uppermost aperture. Galvanometer 12 is a conventional instrument of the reflecting mirror type wherein the mirror is angularly displaced about a vertical axis in response to fluctuations in the input current. The galvanometer is electrically connected to a source of seismic information, which may be either a geophone or system of geophones or a playback device for "phonographic" records. Light source 13 is supported by carriage 7 and has fitted thereto a lens 14 adapted to focus a beam of light upon the galvanometer mirror. A photoelectric cell 15 is positioned behind the disc at the point where the beam of light passes through the apertures. The light sensitive surface of this cell must be sufficiently wide to extend over the distance on the face of the disc over which the light beam may be deflected but cannot in any event be wider than the distance between adjacent apertures on the disc. The photoelectric cell is carried by carriage 7 and is connected electrically to a conventional amplifier 16, also positioned on the carriage. The output of amplifier 16 is delivered to the metallic surface of disc 9 by means of a carbon brush 17 retained by a brush rigging 18 attached to the carriage. Brush 17 contacts the surface of the disc. The entire apparatus may be supported by a suitable frame which is not shown.

In recording seismic information with the apparatus of the invention, an electrical impulse is fed into reflecting mirror galvanometer 12. The source of the impulse may be either a geophone or system of geophones or a playback device for "phonographic" seismic recordings. The magnitude of this electrical impulse determines the angular displacement of the galvanometer mirror about its vertical axis. A beam of light from source 12 is focused by lens 14 onto the galvanometer mirror and reflected to the face of disc 9 as the disc rotates. This beam of light passes through an aperture 10 of the disc at some point as the corresponding stylus 11 brushes across the surface of the electrosensitive paper. Photoelectric cell 15 is energized by the light passing through the aperture and an electrical impulse is thus created. This impulse is amplified by amplifier 16 and returned to the surface of the disc through brush 17. The stylus in contact with the paper is thus charged. The electrical charge passes through the paper to the grounded drum, producing a mark or burn on the paper.

As the disc rotates further, the aperture moves out of the path of the light beam, deenergizing the photoelectric cell and cutting off the current to the stylus. The stylus thereupon ceases to mark the paper. Each stylus is thus energized and marks the paper only during the brief instant the beam of light passes through the aperture for that stylus. The other apertures in turn admit light to the photoelectric cell as the disc rotates, energizing the corresponding styli and producing successive marks on the paper.

Drum 1 rotates at a constant speed during recording, continuously advancing the electrosensitive paper. As the amplitude of the signal supplied to the galvanometer changes, the angular displacement of the galvanometer mirror undergoes a corresponding change and the light beam passes through the apertures at an earlier or later point as the disc rotates. The stylus in contact with the paper is thus energized at a point on the paper to the right or to the left of the previous mark. A succession of marks thus produced on the paper results in an oscillatory trace which will permit analysis of the seismic information received from the geophone or "phonographic" record.

The number of marks impressed on the trace per unit time is determined by the number of apertures and styli and by the speed of rotation of the disc. A disc having 20 styli and rotating at 3000 revolutions per minute, 50 revolutions per second, will produce a mark every $\frac{1}{1000}$ of a second. The number of apertures and styli may range from as few as four to as many as twenty or more and the rotational speed of the disc may range from as low as 300 R. P. M. to 4800 R. P. M. or higher. To permit accurate timing it is preferred that the seismic trace be composed of marks made at least every $\frac{1}{500}$ of a second.

The rate at which the paper advances determines the distance separating marks on a trace made by a disc having a given number of styli and apertures. Thus at slow rates the marks will be relatively close together and with higher rates they will be farther apart. To permit rapid analysis of the traces, the paper should advance at a rate sufficiently high that the marks are clearly discernible one from another and may be readily counted. Advance of the paper is governed by the speed at which the drum rotates, which will normally be in the range of about 1 to 10 R. P. M., depending upon the drum diameter.

Figure 3:
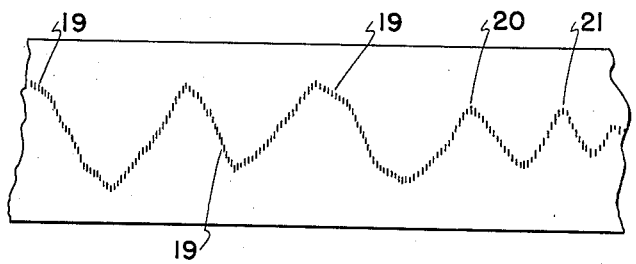
Figure 3 represents a variable amplitude seismic record prepared by the apparatus of the invention.

Figure 3 illustrates a section of a seismic trace recorded by the apparatus of the invention. Individual marks of the trace are designated by reference numerals 19. Peaks in amplitude are shown at 20 and 21. The trace illustrated was prepared on a recorder making a mark every $\frac{1}{1000}$ of a second. The time interval between peaks in $\frac{1}{1000}$ of a second can therefore be determined merely by counting the number of marks between the peaks. The time interval between the shot and any point on the trace can be determined in a similar manner.

Although the apparatus has been discussed in terms of recording seismic information, it will be apparent that this apparatus can be utilized to prepare a graphic record of any electric current ranging from a simple direct current to complex, high frequency alternating currents. Seismic impulses generally have frequencies between about 1 and about 200 cycles per second but the apparatus is not limited to this range and can record much higher frequencies. The apparatus is also capable of recording complex modulated waves as well as simple sinusoidal waves. The apparatus is therefore suited for use in many electrical and electronic applications.

Numerous modifications may be made in the apparatus without departing from the spirit of the invention and will be apparent to those skilled in the art. It is fully intended to cover such modifications as fall within the scope of the claims.

The nature and objects of the invention having been fully described and illustrated, what is claimed is:

1. A variable amplitude seismic recorder comprising in combination a reflecting mirror galvanometer connected to a source of seismic information, a light source adapted to focus light rays upon said galvanometer, a photoelectric cell positioned to receive light rays reflected by said galvanometer, a rotatable disc having a plurality of apertures about the circumference thereof positioned between said galvanometer and said cell whereby said cell is periodically energized by light rays passing through said apertures as said disc is rotated, an amplifier connected to said cell, a plurality of styli disposed about the periphery of said disc, means for applying the output of said amplifier to said styli, means for moving electrosensitive paper parallel to the axis of said disc whereby said styli brush across said paper in succession, and means for rotating said disc.

2. A variable amplitude seismic recorder comprising in combination a reflecting mirror galvanometer connected to a source of seismic information, a light source adapted to focus light rays upon said galvanometer, a photoelectric cell positioned to receive light rays reflected by said galvanometer, a rotatable disc perforated by a plurality of apertures spaced evenly about the circumference thereof interposed between said galvanometer and said cell whereby said reflected light rays pass through individual apertures in succession as said disc is rotated, an amplifier connected to said cell, means for applying the output of said amplifier to the surface of said disc, a plurality of styli disposed about the periphery of said disc, a rotatable drum adapted to carry a strip of electrosensitive paper beneath said disc whereby said styli brush across the surface of said paper in succession, means for rotating said disc, and means for rotating said drum.

3. In a variable amplitude seismic recording apparatus, a rotatable disc perforated by apertures about the circumference thereof, means for rotating said disc, a stylus corresponding to each of said apertures extending radially from the periphery of said disc, a light source, a reflecting mirror galvanometer connected to a source of seismic information and adapted to reflect a light beam from said light source through individual apertures in succession as said disc is rotated, a photoelectric cell adapted to be energized by light passing through said apertures, an amplifier connected to said cell, a brush connected to said amplifier and adapted to contact said disc, and a drum adapted to carry a strip of electrosensitive paper whereby said styli contact said paper in succession as said disc rotates.

4. An apparatus for graphically recording electrical impulses as oscillating traces upon electrosensitive paper comprising in combination a reflecting mirror galvanometer connected to an electrical impulse source, a light source adapted to focus a beam of light upon the mirror of said galvanometer, a rotatable disc perforated by a plurality of apertures spaced at regular intervals in a circle thereon, a photoelectric cell positioned to receive light from said galvanometer mirror through the lowermost aperture in said disc as said disc is rotated, an amplifier connected to said cell, a brush connected to said amplifier and adapted to energize said disc, a plurality of electrical styli extending at regular intervals from the periphery of said disc, a rotatable drum adapted to carry a strip of electrosensitive paper parallel to the axis of said disc whereby the lowermost stylus on said disc brushes across said paper as said disc rotates, means for rotating said disc, and means for rotating said drum.

No references cited